United States Patent
Heredia Álvaro et al.

(10) Patent No.: US 11,807,761 B2
(45) Date of Patent: Nov. 7, 2023

(54) COMPACT COMPOUND COMPRISING SILANIZED HYDROXYL GRAPHENE WITH THERMOSETTING POLYMER

(71) Applicant: GRAPHENGLASS, S.L., Castellón de la Plana (ES)

(72) Inventors: José Antonio Heredia Álvaro, Castellón de la Plana (ES); Vicente Montesinos Contreras, Castellón de la Plana (ES); Alfonso Javier Heredia Álvaro, Grao de Castellón (ES); Vicente Montesinos Navarro, Castellón de la Plana (ES)

(73) Assignee: GRAPHENGLASS, S.L., Castellon (ES)

(*) Notice: Subject to any disclaimer, the term of this patent is extended or adjusted under 35 U.S.C. 154(b) by 253 days.

(21) Appl. No.: 17/438,592

(22) PCT Filed: Mar. 13, 2020

(86) PCT No.: PCT/EP2020/056881
§ 371 (c)(1),
(2) Date: Sep. 13, 2021

(87) PCT Pub. No.: WO2020/182988
PCT Pub. Date: Sep. 17, 2020

(65) Prior Publication Data
US 2022/0127464 A1  Apr. 28, 2022

(30) Foreign Application Priority Data
Mar. 13, 2019 (EP) .................................... 19382185

(51) Int. Cl.
*C09C 1/44* (2006.01)
*C09D 167/02* (2006.01)
(Continued)

(52) U.S. Cl.
CPC .............. *C09C 1/44* (2013.01); *C09D 167/02* (2013.01); *B82Y 30/00* (2013.01); *B82Y 40/00* (2013.01)

(58) Field of Classification Search
CPC ........... C09C 1/44; C09C 1/46; C09D 167/02; B82Y 30/00; B82Y 40/00; C08K 3/042;
(Continued)

(56) References Cited

U.S. PATENT DOCUMENTS

| | | | | |
|---|---|---|---|---|
| 2012/0330044 A1* | 12/2012 | Hou | ...................... | B82Y 40/00 556/418 |
| 2014/0275597 A1* | 9/2014 | Zhang | ................... | C07F 7/1896 556/418 |
| 2019/0233702 A1* | 8/2019 | Xu | .......................... | C08K 3/04 |

FOREIGN PATENT DOCUMENTS

| | | |
|---|---|---|
| CN | 108264755 A | 7/2018 |
| EP | 2067741 B1 | 6/2009 |
| KR | 20170042051 A | 4/2017 |

OTHER PUBLICATIONS

Wan, et al., Mechanical properties of epoxy composites filled with silane-functionalized graphene oxide, Composites: Part A 2014; 64: 79-89 (Year: 2014).*

(Continued)

*Primary Examiner* — Daniel C. McCracken
(74) *Attorney, Agent, or Firm* — Hayes Soloway PC (57) ABSTRACT

The present invention relates a compact compound and their preparation and more particularly to such compact compound prepared from hydroxyl graphene functionalized and combinations with thermosetting polymer with particular particles of specified size, shape and properties. The present invention relates generally to field of nanomaterials and preparation of nanomaterials as well as use of nanomaterials in architecture, engineering and interior design.

14 Claims, 7 Drawing Sheets

(51) Int. Cl.
B82Y 30/00 (2011.01)
B82Y 40/00 (2011.01)

(58) Field of Classification Search
CPC ......... C08K 9/02; C01B 32/194; C01B 32/19;
C01B 32/21; C01B 32/182; C01B 32/184;
C01B 32/186; C01B 32/188; C01B
32/192; C01B 32/196; C01B 32/198;
C01B 2204/00; C01B 2204/02; C01B
2204/04; C01B 2204/06; C01B 2204/065;
C01B 2204/20; C01B 2204/22; C01B
2204/24; C01B 2204/26; C01B 2204/28;
C01B 2204/30; C01B 2204/32; C01B
32/20; C01B 32/205; C01B 32/215; C01B
32/22; C01B 32/225; C01B 32/23
See application file for complete search history.

(56) References Cited

OTHER PUBLICATIONS

Li, et al., Silanized graphene oxide reinforced organofunctional silane composite coatings for corrosion protection, Progress in Organic Coatings 2016; 99: 443-451 (Year: 2016).*

Lin, et al., Reduced silanzied graphene oxide/epoxy-polyurethane composites with enhanced thermal and mechanical properties, Applied Surface Science 2014; 316: 114-123 (Year: 2014).*

Jing Sun, "A New Graphene Derivative: Hydroxylated Graphene with Excellent Biocompatibility", Journal, 2016, 10226-10233, vol. 8, No. 16, ACS Applied Materials & Interfaces.

Jing Lin, "Reduced Silanized Graphene Oxide/Epoxy-Polyurethane Composites with Enhanced Thermal and Mechanical Properties", Journal, 2014, 114-123, vol. 316, Applied Surface Science.

Won Kyu Park, "Facile Synthesis of Graphene Oxide in a Couette-Taylor Flow Reactor", Journal, 2015, 217-223, vol. 83, Carbon.

Tuan Sang Tran, "High Shear-Induced Exfoliation of Graphite into High Quality Graphene by Taylor-Couette Flow", Journal, 2016, 12003-12008, vol. 6, RSC Advances.

Pooneh Haghdadeh, "The Role of Functionalized Graphene Oxide on the Mechanical and Anti-Corrosion Properties of Polyurethane Coating", Journal, 2018, 199-212, vol. 86, Journal of the Taiwan Institute of Chemical Engineers.

Duxin Li, "Effect of Modified Graphene on Thermal, Mechanical and Tribological Performance of Polyimide Based Composites", Journal, 2018, 1-12, vol. 5, Materials Research Express.

Minjae Kim, "Effect of Surface Treatment of Graphene Nanoplatelets for Improvement of Thermal and Electrical Properties of Epoxy Composites", Journal, 2015, 34-40, vol. 16, No. 1, Carbon Letters.

J. Rodriguez, "Tribological Properties of Commerical Optical Disks Estimated from Nanoindentation and Scratch Techniques", Journal, 2007, 1545-1550, vol. 263, Wear.

* cited by examiner

Fig. 9 ial contact. In addition, the disclosed nanocomposite has superior mechanical strength and degradation properties in comparison to commercially available nanocomposites. Indeed, the disclosed nanocomposite has mechanical properties equal to steel and aluminium products. Furthermore, the disclosed nanocomposite has a significantly reduced weight in comparison to steel and aluminium products and commercially available nanocomposites. Hence, the disclosed nanocomposites are particularly useful for building of robust yet lightweight components.

COMPACT COMPOUND COMPRISING SILANIZED HYDROXYL GRAPHENE WITH THERMOSETTING POLYMER

CROSS-REFERENCE TO RELATED APPLICATIONS AND PRIORITY

This patent application claims priority from PCT Application No. PCT/EP2020/056881 filed Mar. 13, 2020, which claims priority from EP Patent Application No. 19382185.7 filed Mar. 13, 2019.

The present invention relates a compact compound and their preparation and more particularly to such compact compound prepared from hydroxyl graphene functionalized with silane and combinations with thermosetting polymer with particular particles of specified size, shape and properties. The present invention relates generally to field of nanomaterials and preparation of nanomaterials as well as use of nanomaterials in architecture and interior design.

BACKGROUND ART

Nanocomposite materials with graphene have emerged in the past years a promising class of materials which may take advantage of greatly increased interfacial area and interactions. Currently, multifunctional nanocomposites with improved mechanical performance have been reported, primarily fabricated by addition of functionalized nanotubes and graphene oxides. Current art approaches try to translate the extraordinary graphene mechanical properties and low loading to the resulting nanocomposite with the smallest percentage of graphene possible, usually in a proportion less than 1%, in some less frequent instances less than 5%. In addition to the mechanical properties, graphene exhibits flame retardancy and good environmental acceptance that are critical to many architectonical and engineering applications. It is assumed that the functionality of graphene derivatives is critical to reduce further the graphene rate, making them more dispersed and adopting a more uniform organizational structure to enhance the overall performance of the resulting nanocomposite. In particular, some improvements in mechanical properties such as Young's modules, tensile and flexural strength have been reported.

Increasing the proportion of graphene is problematic due to poor aqueous dispersity, stubborn contaminations, excessive aggregations, poor control of surface chemistries, and low interfacial interactions. Graphene oxide (GO) and others derivatives are functionalized to ease the dispersion and improve the chemical interactions with the polymeric matrix. Synthesis of GO, as Hummers based methods, generate graphene with oxygen molecules together with a heterogeneous oxygen-containing functional groups, such us carboxyl, epoxy, or hydroxyl groups, but an uncontrolled proportion of these groups have been reported. However, studies show how this same groups may be harmful to the thermal stability, flammability and degradation behaviour of the resulting nanocomposite [J. Rodriguez, A. Rico, V. Soria, Tribological properties of commercial optical disks estimated from nano-indentation and scratch techniques, Wear 263(2007) 1545]. Furthermore, the GO is highly flammable in the presence of contaminants like KOH, usually a by-product left from synthesis. These authors also show us that, at this proportion (5%), the graphene sheets tend to agglomerate seriously hindering the efficiency of GO as a flame retardant.

Interfacial interactions between polymers and graphene-based materials play a key role in the mechanical integrity and its performance against heat and other environmental variables. Several patents and papers show how different functionalization may improve the resulting performance. The ultimate properties of the graphene-based polymer nanocomposites are critically depending upon processing conditions during the nanocomposite fabrication. The high-aspect ratio graphene components are prone to random wrinkling, bucking, and folding during processing which dramatically affect the ultimate performance. Pre-treatment of graphene derivatives by grafting with compatible substances is a routine looking for enhanced interfacial bonding, which, however, requires additional complex processes.

Silanes is a wide family of components that work as adhesion promoters uniting the different phases present in a composite material. Silanes form molecular bridges to create stronger and more stable bonds. In a first step, by a hydrolysis process silanol is obtained. The silanol can be fixed on the filler surface through hydrogen bonding with the surface OH groups. As long as there is only hydrogen bonding the silane can still migrate on the filler surface. The covalent bond through oxygen molecules finally fixes the silane with the filler surface. Then, the silane organofunctional group bonds with the polymer by chemical reactions (such as grafting, addition, and substitution) and by physic-chemical interactions such as hydrogen bonding. However, the silanes react also with themselves to produce three-dimensional networks which adversely affect the resulting composite.

The silanization modification technique on carbon nanotubes and GO has been previously reported [EP 2067741 B1], however, the proportion of graphene in the composition in this technology remain at low levels of 1 wt %. Using tube-shaped carbon nanotubes, the bonding agents and the polymer chains are unable to enter the interior of the nanotubes, compared with the GO sheets in which both the top and bottom surface can be bond with the other components.

In the prior art, it is believed that increasing the proportion of graphene in a composite would lead to excessive aggregation and poor dispersion decreasing interfacial area and weak interfaces thereby resulting in poor performance. The specific embodiments reported in prior art propose a small percentage of graphene. Also, the properties of the nanocomposites still fall short of the expected characteristics considering the superior properties of graphene in relation with potential applications in architecture and engineering. Specific embodiments are not found for these application fields (most reported applications are, usually, targeted towards electronic and chemical processes applications).

Due to conflicting reinforcing mechanisms, it is a problem to obtain a graphene-based nanocomposite with adapted superior mechanical strength and degradation properties required for specific applications in architecture and engineering. Efforts to improve one property lead to adverse effects on the others. Therefore, substantial research was needed to solve the problem this invention solves.

SUMMARY OF THE INVENTION

The present invention discloses a novel nanocomposite made of hydroxyl graphene functionalized with silane and thermosetting polymers that can include other minerals as fillers (preferably ceramics), other nanomaterials (including 2D crystals) and additives, and methods of making nanocomposites of such a new category of graphene-based nanocomposites. Contrary to the prior technologies, the graphene-based nanocomposites disclosed in this invention has graphene as the main component in terms of surface covered and with a weight percentage up to 50%, and accordingly leading to lighter and more resistant nanocomposite otherwise not available.

A first aspect of the present invention related to a compact compound comprising:
a) hydroxyl graphene functionalized with silane; and
b) a thermosetting polymer;
wherein the percentage of hydroxylation in the graphene unfunctionalized is between 90% and 100% by the presence of the singlet at 533.4 eV as measured by XPS; and wherein the amount of the thermosetting polymer is between 40% and 99% in weight with respect the compact compound.

The term "compact compound" as used herein refers to a nanocomposite that comprises hydroxylate graphene, that is obtained by the method described in the present invention and functionalized with silane groups and a thermosetting polymer. When hydroxylated graphene is functionalized with silane groups, the only functional groups that remain unreacted with said silane groups are —OH groups. It is remarkable that this situation is opposed to when a graphene oxide, common in the state of the art, reacts with silane groups, where only hydroxyl groups react and the groups that remain unreacted are the unreacted OH groups, as well as ketone and carboxyl groups. improves the reactivity of graphene with silane since the links are made by substituting these OH groups and as a consequence the number of links with the polymer chains is substantially increased so the toughness of the compact compound was between 1.7 and 2 times in comparison with unmodified composites. Besides, and as a consequence of said toughness, the composite achieves a greater dispersion and allowing to reach more dispersed graphene (up to 50% wt) than what is achieved by the techniques representing the state of the art.

The term "nanomaterial or nanocomposite" as used herein refers to materials of which a component unit is sized in at least one dimension between 1 nm to 100 nm.

The term "silane" or "organosilane" as used herein refers to suitable silanes with a general formula of structure $[Y-R]_{(4-a-b-c)}Si(X^1)_a(X^2)_b(X^3)_c$
wherein:
wherein (a+b+c) is an integer from 1 to 3, and preferably is 3.
R is selected from among a $C_1$-$C_{12}$ alkyl, $C_2$-$C_6$ alkenyl.
Y is selected from among $C_1$-$C_8$ alkyl or —$NR_1R_2$ amine.
$X^1$, $X^2$ and $X^3$ are independently selected from among O—$C_1$-$C_6$ alkyl, —O—CO—$C_1$-$C_6$ alkyl, —$NR_1R_2$ amine.

In the present invention, the term "$C_1$-$C_{12}$ alkyl" relates to aliphatic, linear or branched chains containing between 1 and 12 carbon atoms, such as for example, but not limited to, methyl, ethyl, n-propyl, i-propyl, n-butyl, terc-butyl, sec-butyl, n-pentyl or n-hexyl. The term "$C_1$-$C_8$ alkyl" relates to aliphatic, linear or branched chains containing between 1 and 8 carbon atoms, such as for example, but not limited to, methyl, ethyl, n-propyl, i-propyl, n-butyl, terc-butyl, sec-butyl, n-pentyl, n-hexyl, n-heptyl, 1',1'-dimethylheptyl, 1,2-dimethylheptyl or 1',1'-dimethylethyl, n-octyl. "$C_1$-$C_6$ alkyl" relates to aliphatic, linear or branched chains containing between 1 and 6 carbon atoms, such as for example, but not limited to, methyl, ethyl, n-propyl, i-propyl, n-butyl, tert-butyl, sec-butyl, n-pentyl or n-hexyl. For both three terms, the alkyl group may be optionally substituted by one or more substitutes such as halogen, hydroxyl, epoxy, $C_2$—C alkenyl, —O—$C_1$-$C_8$ alkyl, —CO—$C_1$-$C_6$ alkyl, $C_6$-$C_{18}$ aryl, —CN, —COOH, —COO—$C_1$-$C_6$ alkyl, —CONH—$C_1$-$C_6$ alkyl, —$NR_1R_2$ amine, or —$SO_2$— $C_1$-$C_6$ alkyl.

The term "$C_2$-$C_6$ alkenyl" relates to carbonated, linear or branched chains having at least one double bond and containing between 2 and 6 carbon atoms, such as for example, but not limited to, vinyl, 1-propenyl, 2-propenyl, 1-butenyl, 2-butenyl, 3-butenyl, 1,3-butadienyl, 3-methyl-2-butenyl. For both terms, the alkenyl group may optionally be substituted by one or more substitutes such as halogen, hydroxyl, epoxy, —O—$C_1$-$C_6$ alkyl, —CO—$C_1$-$C_6$ alkyl, —CN, —COOH, —COO—$C_1$-$C_6$ alkyl, $C_1$-$C_6$—CONH-alkyl or $C_1$-$C_6$—$SO_2$-alkyl.

The term "amine" relates, in the present invention to a group of formula —$NR_1R_2$; wherein $R_1$ or $R_2$ are independently selected from among hydrogen, $C_1$-$C_{12}$ alkyl, —O—$C_1$-$C_{12}$ alkyl, halogen, hydroxyl, —CO—$C_1$-$C_6$ alkyl, —CN, —COOH, —COO—$C_1$-$C_6$ alkyl, —CONH—$C_1$-$C_6$ alkyl —$SO_2$— $C_1$-$C_6$ alkyl.

In a preferred embodiment Y is —$NR_1R_2$ amine. And in a more preferred embodiment $R_1$ or $R_2$ are hydrogen.

In another preferred embodiment Y is $C_1$-$C_8$ alkyl which is substituted by at least one epoxy group.

In another preferred embodiment $X^1$, $X^2$ and $X^3$ are —O—$C_1$-$C_6$ alkyl group, more preferred are independently methoxy or ethoxy group.

In another preferred embodiment of the present invention the silane is [3-(2,3-Epoxypropoxy)propyl]trimethoxysilane In another preferred embodiment of the present invention the silane is 3-methacryl oxypropyl-trimethoxysilane.

The new material obtained, as described in the present invention, was submitted to the traditional tensile test and two additional tests to find its behaviour for these specific applications. The advantages of the compact compound of the present invention relates to exterior or architectonic applications:
- the presence of the compact compound avoids a colour degradation and surface scratching in existing materials.
- the loss blackness with solar radiation exposure, the perceived blackness of the invention increases after UV radiation.
- improvement of the tensile strength up to 33% over the raw unsaturated polyester sample.
- the toughness of the new composite was increased between 1.7 and 2 times that of the unmodified case.

Thus, a preferred embodiment of the compact compound of present invention, the hydroxyl graphene is multilayer with less than 10 layers in average (few-layer). In a more preferred embodiment of the compact compound of present invention, the hydroxylate graphene is monolayer predominantly.

The term "few-layer hydroxyl graphene" as used herein refers to any hydroxyl graphene that have a number of layers between 2 and 10.

The term "hydroxyl graphene" as used herein refers to a graphene wherein there is more than a 90% of oxygen-containing groups as hydroxyl. It is remarkable the absence of other functional groups as ketones or carboxyl groups in the hydroxyl graphene.

The term "reinforcement material" as used herein refers to any material that increases some mechanical, thermal and/or chemical properties of the neat resin system while lowering the material cost. In the present invention the reinforcement material is selected but not limited from silica, quartz, glass, clay, aluminium, alumina trihydrate.

In another preferred embodiment of the compact compound of present invention, the thermosetting polymer is selected from bis-phenol-A glycidyl ether, novalic glycidil ethers, aliphatic glycidyl ethers, hydantoin glycidyl ethers, cycloaliphatic epoxides and brominated modifications of thereof, epoxy acrylate resin, orthophtalic polyester resin, isophtalic polyester resin, polyether polyols, and polyalkylene glycols.

In another a preferred embodiment of the compact compound of present invention, further comprising a reinforcement material selected from silica, quartz, glass, clay, aluminium, alumina trihydrate, cristobalite, carbon fiber, glass fiber woven sheets and any combination thereof, and wherein the reinforcement material average size is between 1 nm and 5000 μm.

In a more preferred embodiment of the compact compound of present invention, the reinforcement material average size is between 1 nm 100 nm.

In another a preferred embodiment of the compact compound of present invention, further comprising a fire-retardant additive selected from ATH (Alumina Trihydrate), ammonium polyphosphate, magnesium hydroxide, Magnesium aluminum-layered double hydroxide (LDH), LDH carbonate, d-LDH, aluminium diethyl phosphinate, melamine polyphosphate.

In another a preferred embodiment of the compact compound of present invention, further comprising a pigment with an average size of between 1 nm and 5000 μm and selected from
- metal oxides, wherein the metal is selected from aluminium, iron, copper, titanium, manganese, cobalt, cadmium, zinc and any combination thereof;
- metal salt, wherein the metal is selected from aluminium, iron, copper, titanium, manganese, cobalt, cadmium, zinc and any combination thereof; and
- any combination thereof.

A second aspect of the present invention is a method for obtainment a compact compound characterizes in that it comprising the following steps:
- a) Obtaining a hydroxyl graphene from graphite wherein the percentage of hydroxylation in the graphene is between 90% and 100% by the presence of the singlet at 533.4 eV as measured by XPS;
- b) Silanization of the hydroxyl graphene obtained in step (a) with sonication and mechanical agitation;
- c) Dispersing a precursor of a thermosetting polymer into the silane-functionalized hydroxyl graphene obtained in step (b) by mechanical agitation and sonication, and polymerization; and
- d) Curing by thermal treatment of the product obtained in step (c).

In another a preferred embodiment of the method for obtainment a compact compound, the obtainment of the hydroxyl graphene of step (a) is performed by the following steps
- a1) mixing an amount of between 99 g and 101 g of graphite, and amount of between 8 g and 12 g of 2M NaOH in a volume of between 250 mL and 350 mL of $H_2SO_4$ 98%, and adding an amount of between 70 g and 90 g of $KMnO_4$ to the mixture at a temperature of between 1° C. and 10° C. with stirring for a time of between 30 min and 40 min,
- a2) injecting the mixture obtained in step (a1) in a Couette-Taylor flow reactor, and mixing for a time period of between 1 h and 1.2 h at a rotating speed of the inner cylinder between 900-1100 rpm,
- a3) 400-450 ml of purified water and 90-100 ml of peroxide, $H_2O_2$ 30%, is added to the mixture obtained in step (a2), and then stirred for 40-50 min, and precipitating out the non- or under-hydroxilated graphitic particles by further centrifugation at 4000 rpm for 30 min;
- a4) purifying the slurry obtained in the step (a3) for a period time of between 1 h and 3 h by centrifugation at a revolution of between 3700 rpm and 4200 rpm for a time of between and filtering the particles formed after centrifugation by press filter, wherein distilled water is continually fed into the reactor; and
- a5) dispersing in water the remaining solid obtained in step (a4) and filtering in a membrane with a pore of 1 μm or less, and drying the recovered solid after filtration.

The term "Couette-Taylor flow reactor" as used herein refers to any reactor that comprises a rotating cylinder within a stationary cylindrical. At a specified rotating speed, toroidal vortices are created along the cylinder axis.

In another a preferred embodiment of the method for obtainment a compact compound, the obtainment of the hydroxyl graphene functionalized with silane of step (b) is performed by the following steps
- b1) hydrolysing an organosilane in a water solution,
- b2) adding progressively the dry hydroxyl graphene obtained in step (a) into the water solution obtained in step (b1) maintain the magnetic agitation for at least 15 min,
- b3) sonicating the mixture obtained in the step (b2) for a period of time of between 30 min and 60 min with a frequency of between 20 kHz and 40 kHz; and
- b4) drying the solid obtained in step (b3) at a temperature of between 100° C. and 150° C. for a period of time of between 4 h and 6 h.

In another a preferred embodiment of the method for obtainment a compact compound, the obtainment of the thermosetting polymer with the silane-functionalized of step (c) is performed by following the next steps
- c1) dispersing the precursor of the thermosetting polymer for at least 15 min on the hydroxylate graphene functionalized with silane obtained in step (b) under magnetic vibration;
- c2) adding an initiating polymerization agent and a catalytic drier into the mixture obtained in step (c1) stirring for at least 2 min at a temperature of between 30° C. and 50° C.; and
- c3) sonicating the mixture obtained in the step (c2) for a period of time of between 30 min and 60 min with a frequency of between 20 kHz and 40 kHz.

In another a preferred embodiment of the method for obtainment a compact compound, the curing of step (d) is performed at a temperature of between 15° C. and 25° C. for a time period of between 20 h and 28 h.

In another a preferred embodiment of the method for obtainment a compact compound, an additional post cured is performed at a temperature of between 55° C. and 75° C. for a time period of between 3 h and 6 h. The post cure involves increasing the laminate temperature after the initial temperature cure, which increases the amount of cross-linking of the molecules that can take place. To some degree this post cure will occur naturally at warm room temperatures, but higher properties and shorter post cure times will be obtained if elevated temperatures are used. This is particularly true of the material's Glass Transition Temperature (Tg), which, up to a point, increases with increasing post cure temperature.

A third aspect of the present invention is the use of the compact compound described in the first aspect of the present invention as architectonic, engineering and interior design applications such as latticework in building facades, kitchen and bath furniture, urban furniture, countertops, in overcoat painting, protective devices of electronic components, and manufactured components of transport vehicles (wagons, bicycles, motor vehicles (motorcycles, cars, trucks, buses), railed vehicles (trains, trams), watercraft (ships, boats), amphibious vehicles (screw-propelled vehicle, hovercraft), aircraft (airplanes, helicopters).

In another a preferred embodiment of the use of the compact compound described in the first aspect of the present invention as overcoat painting.

The term "precursor of the thermosetting polymer" as used herein refers to a monomer or system of monomers which are capable of obtain a thermosetting polymer by reactive groups to a fully cured high molecular weight state.

The term "initiating polymerization agent" as used herein refers to usually molecules that are added to begin the radical polymerization process.

The term "catalytic drier" as used herein refers to an agent used to accelerate the polymerization of the resin thus acts as a drier.

Unless otherwise defined, all technical and scientific terms used herein have the same meaning as commonly understood by one of ordinary skilled in the art to which this invention belongs. Methods and materials similar or equivalent to those described herein can be used in the practice of the present invention. Throughout the description and claims the word "comprise" and its variations are not intended to exclude other technical features, additives, components, or steps. Additional objects, advantages and features of the invention will become apparent to those skilled in the art upon examination of the description or may be learned by practice of the invention. The following examples, drawings and sequence listing are provided by way of illustration and are not intended to be limiting of the present invention.

BRIEF DESCRIPTION OF THE DRAWINGS

FIG. 6. EDX spectrum in the adherence zone
FIG. 7. SEM images of the nanocomposite showing few layers graphene sheets linked with the polymer matrix.

EXAMPLES

Example 1

Obtaining of the Hydroxylate Graphene.

Graphite flakes were processed using a Couette-Taylor flow reactor. In an embodiment, 100 g of graphite flakes and 10 g of 2M NaOH were added to 300 ml of sulfuric acid ($H_2SO_4$ 98%). Then, 80 g of potassium permanganate ($KMnO_4$) was slowly added to this mixture at 10° C. or lower and the mixture was stirred for 30 min. The mixture was injected into the flow reactor. The rotating speed of the inner cylinder was 1000 rpm during 60 min to obtain a brown-colored pasty slurry. For a workup, 400 ml of purified water and 100 ml of peroxide, $H_2O_2$ 30%, were added to the mixture, and then stirred for 45 min. For purification, a filter press system was used to separate hydroxylate graphene (G-OH) and impurities. Then, non- or under-hydroxilated graphitic particles were precipitated out by further centrifugation at 4000 rpm for 30 min. G-OH slurry and a large volume of distilled water was continually fed into the system until the water and impurities is squeezed out. The purification step was done for 2 h. The remaining G-OH solids were collected and dispersed in water. The supernatant containing single- or few-layer G-O was filtered over a PTFE membrane with a 1 µm pore size and vacuum- or freeze-dried for characterization.

Elemental analysis, size and number of layers was characterized by X-ray diffraction (XRD) using a powder diffractometer D4 Endeavor, Bruker-AXS with Bragg-Brentano θ/2θ geometry with Cu X ray tubes, Raman spectrum with the NRS-3100 (Jasco), and surface area analyzer Gemini V (Micrometrics), and Leica-Zeiss LEO 440 scanning electron microscope (SEM). Results confirmed the exclusive formation of C—OH groups in G-OH due to the hydroxylation process performed. Table 1 shows the elements average values in atomic percentage:

TABLE 1

| Elemental analysis | |
| --- | --- |
| Element | Atomic fraction % |
| C | 79.8 |
| H | 9.8 |
| O | 9.8 |
| Others | <0.4 |

Example 2

Silanization of the Hydroxylate Graphene

Firstly, the organosilane 3-methacryl oxypropyl-trimethoxysilane (MEMO) obtained from Dynasilan was hydrolysed in a water solution in acid environment through the addition of between 0.05 ml and 0.015 ml HCl 33% to achieve pH=1. In this case, 3 g of MEMO was dispersed in 150 ml of distilled water and 1-4 drops of HCl 33% are added. The aqueous solution is agitated during 10 minutes. Next, 150 g of G-OH were added progressively maintain the magnetic agitation during 15 minutes. Then, the combination was realized through a 30 minutes process of sonication (with 20 kHz frequency) maintaining the mixture in vibration. Said 30 minutes process are achieved by following fifteen times alternation of 2 minutes cycles of operation and shutdown.

After silane hydrolisis and bonding with the hydroxil graphene (G-OH), a nanohybrid silane functionalizated graphene (f-G-OH) of size 20-30 nm is obtained.

Figure 1:
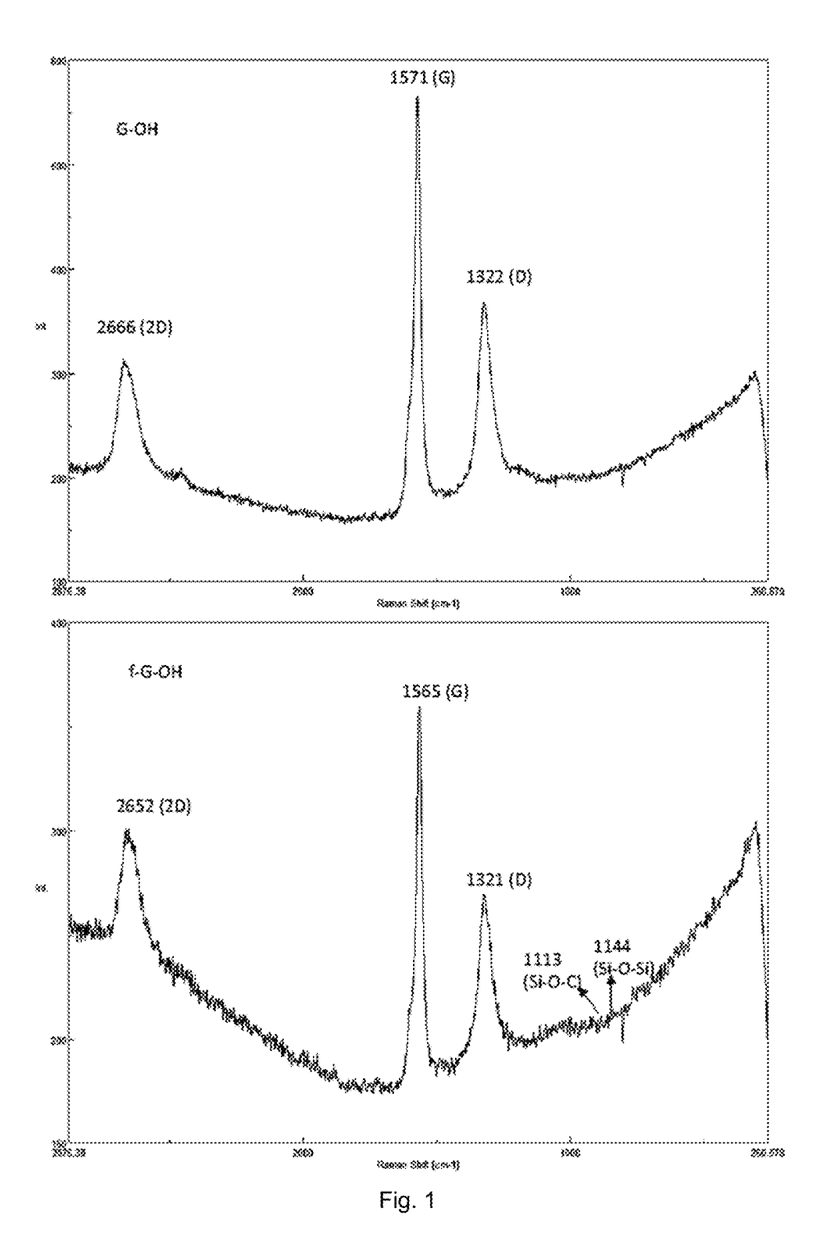
FIG. 1. Raman spectrums of G-OH and f-G-OH of samples.

The resulting functionalized G-OH (f-G-OH) with silane was dried at 125° C. during 5 hours. The FIG. 1 shows the Raman spectrums of the G-OH the f-G-OH. The characteristic D-Band (between 1321-1322 cm$^{-1}$) and G-band (between 1565-1571 cm$^{-1}$) of graphene are visible in both samples. The shift in the position and intensity of the peaks provides insights into the effect of silanization. The presence of Si—O—Si and Si—O—C bands at 1144 and 1113 cm$^{-1}$ confirms the presence of MEMO showing the inter-linkages occurring between the Si—O and C of graphene.

Example 3

Synthesis of the Thermosetting Polymer with the Silane-Functionalized Hydroxyl Graphene (f-G-OH) with Different Wt % of the (f-G-OH) Used.

To prepare the composite at different wt % (f-G-OH), polyester resin (ISO-NPG provided by SUMARCOP,) was bonded with functionalized G-OH (f-G-OH) according to the table 2 to obtain samples with different percentage of the silanizated G-OH relative to the polymeric resin.

TABLE 2

Examples prepared

| sample | Resine (g) | f-G-OH (g) | f-G-OH % | pMEK (g) | Co-Octo (ml) |
|---|---|---|---|---|---|
| 1 | 130 | 0 | 0% | 2.6 | 0 |
| 2 | 130 | 1.3 | 1% | 2.6 | 0 |
| 3 | 130 | 13 | 10% | 2.6 | 0 |
| 4 | 130 | 26 | 20% | 2.6 | 0 |
| 5 | 130 | 39 | 30% | 2.6 | 0.3 |
| 6 | 130 | 52 | 40% | 2.6 | 0.5 |
| 7 | 130 | 59 | 45% | 2.6 | 3.5 |
| 8 | 130 | 65 | 50% | 2.6 | 5 |

The resin was dispersed progressively during 15 minutes under magnetic vibration. To initiate the polymerization reactions, methyl ethyl ketone (pMEK type K1 from AKZO) and 1-5 wt % of Cobalt Octoate 6% are added (depending on the G-OH proportion), and stirred during 2 minutes at 40° C. The combination was sonicated during 30 minutes (with 20 kHz frequency) maintaining the mixture in vibration. Said 30 minutes process are achieved by following fifteen times alternation of 2 minutes cycles of operation and shutdown, and maintaining the temperature controlled.

After curing for 24 hours at 20° C., each composite sample is post cured during 4 hours at 65° C. in order to increase the polymer vitrification and to obtain the resulting nanocomposite.

Example 4

Nanocomposite microstructure characterization of the samples obtained in example 3. To characterize the resulting microstructure, several samples fractured after tensile tests were analysed with SEM. The microstructure is characterized by the presence of graphene sheets and graphene crystal bonded with the polymer through the silica bridges.

Figure 2:
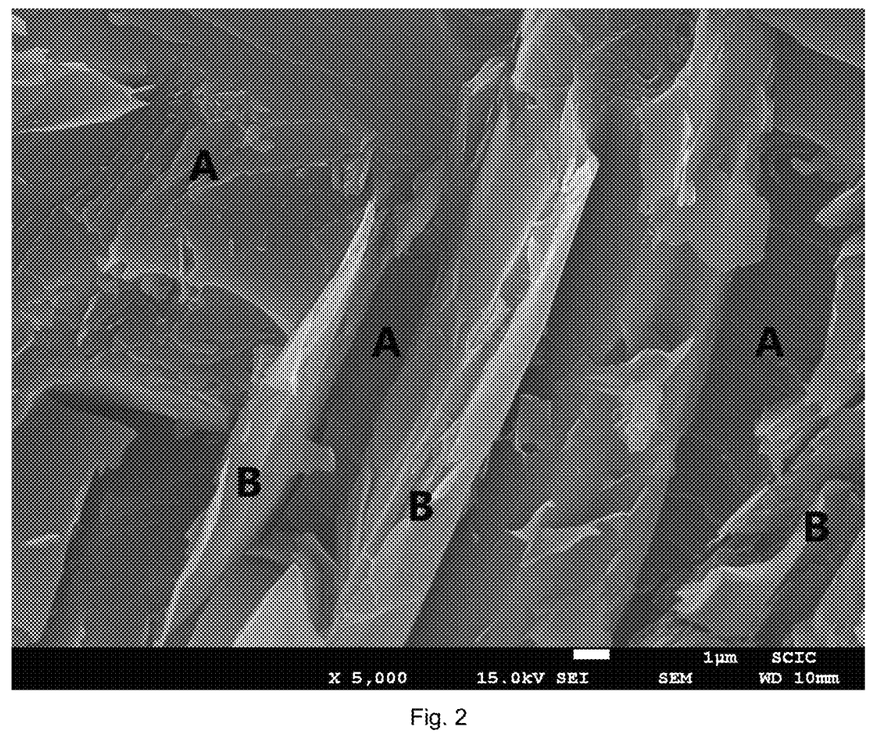
FIG. 2. SEM images showing the functionalized graphene coated with the polymer.

As a consequence of the degree of dispersion achieved, the graphene sheets are well distributed throughout the polymer matrix as can be observed in FIG. 2. Image in FIG. 2 shows that the f-G-OH is well coated with the polymer making the bonds even stronger which also contribute to improve the physical-mechanical properties of the composite. Moreover, the composite also shows clear and good dispersion between all of the particles.

Figure 3:
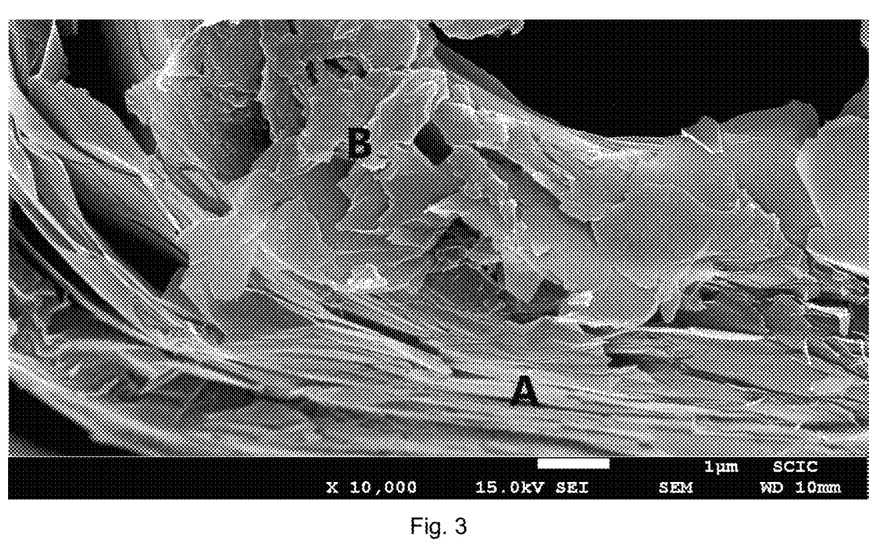
FIG. 3. SEM images of graphene sheets and polymer lamellas intermingled.

Also, the SEM analysis shows that the polyester and graphene sheets are intermingled. FIG. 3 shows some large few layers graphene sheets (A) and polymer lamellas (B) adhered to them.

Figure 4:
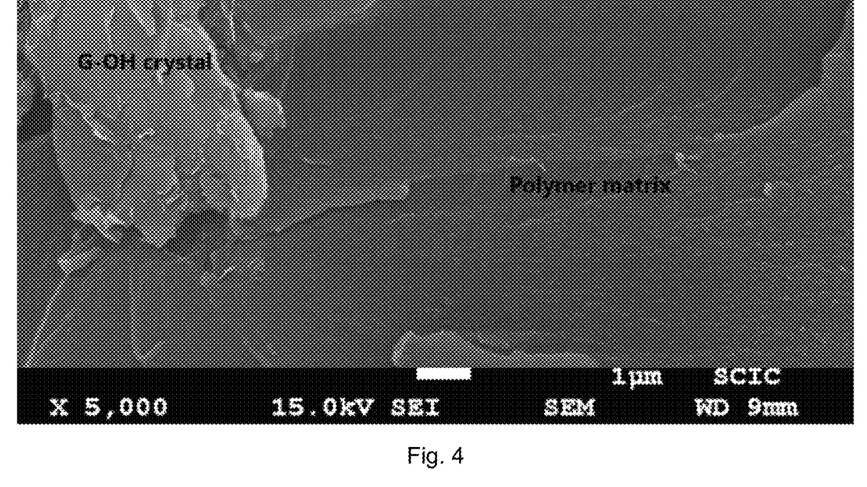
FIG. 4. SEM images of a graphene crystal without functionalization shows not adherence to the matrix polymer.
Figure 5:
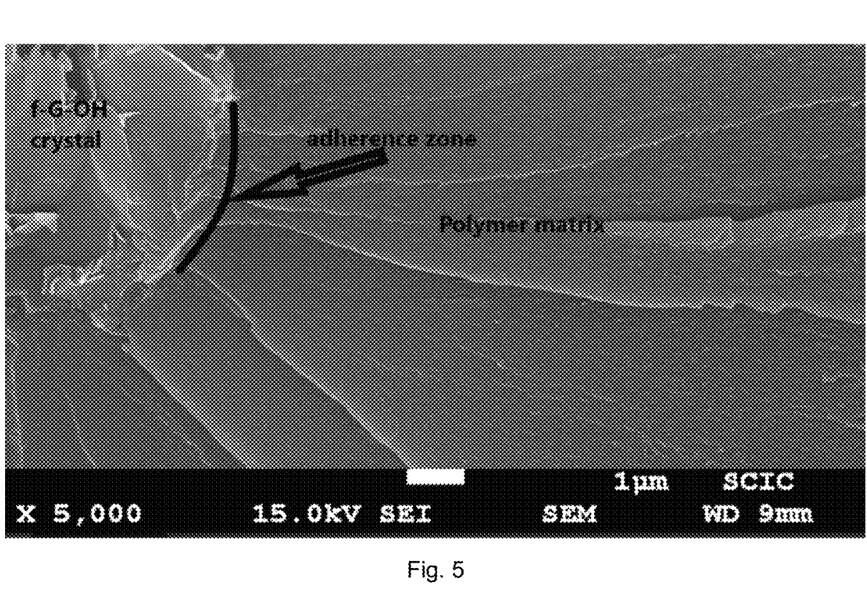
FIG. 5. SEM images of a graphene crystal adhered to the polymer matrix.

The presence of amorphous silica (from silane) crystals confirms its contribution within the composite as a functionalization moiety, thus resulting in successful functionalization of particles within the polymer matrix layers. Images in FIG. 4 shows a graphene crystal in one sample without silane functionalization. It can be observed as the graphene crystal rest on the polymer matrix without adherence. In contrast, in FIG. 5 it can be observed that a crystal of similar size of f-G-OH is clearly bonded to the polymer matrix.

The presence of silica moieties along with graphene showed the presence of dangling bonds resulted in the capture/attraction of silane particles, thereby resulting in the formation of continuous linkages. These linkages provide higher adhesion between the layers, making the composite stronger.

Figure 6:
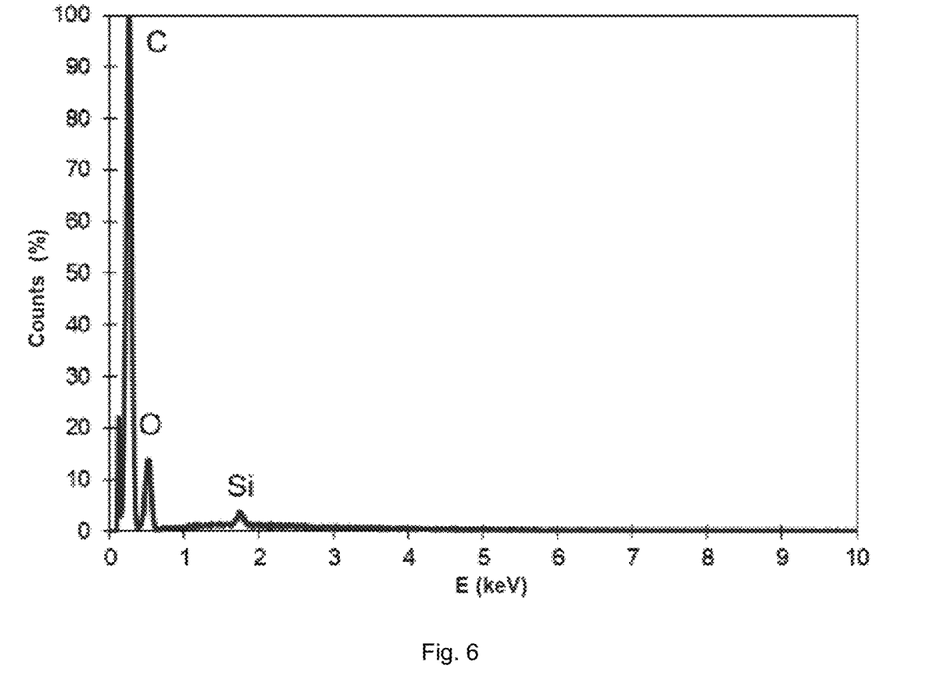

The SEM analysis also shows the presence of exfoliated sheets with a vertical height of 3-4 nm and stacks of just 3-6 layers (FIG. 6).

Example 5

Tensile Tests of the Thermosetting Polymer with the Silane-Functionalized Hydroxylate Graphene.

Tensile tests of the composite of unsaturated polyester with silanizated hydroxyl graphene were performed using a universal testing machine (UTM) (Instron 8841, Norwood, Mass., USA). At least five specimens were tested for each case to ensure the reliability of the test results. The tensile strength, modulus and elongation at break of each sample were measured. Specimens of 3 mm thick and 20 mm in width were prepared for the test. The initial gauge length and cross-head speed was set at 50 mm and 0.5 mm/min, respectively. It was found that the resisting properties of the resulting compound were noticeably higher than the unsaturated polyester resin (table 3).

TABLE 3

Tensile strenght

| Sample | σ max (Mpa) |
|---|---|
| 1 | 50.7 |
| 2 | 60.9 |
| 3 | 62.6 |
| 4 | 65.3 |
| 5 | 65.6 |
| 6 | 66.2 |
| 7 | 67.0 |
| 8 | 67.3 |

Results showed significant improvement due to the dispersion (arriving up to 50% of graphene wt %) and the interfacial interactions between the nanohybrid and the polymer composite arising from the covalent bonding between the functionalized graphene and the polymer matrix. Table 3 shows improvement of the tensile strength up to 33% over the raw unsaturated polyester sample (sample 1). Furthermore, the toughness of the new composite was increased between 1.7 and 2-times that of the unmodified case. These results show that silane functionalization groups offer increased interfacial reactivity between G-OH and matrix.

Example 6

Blackness after UV Radiation of the Thermosetting Polymer with the Silane-Functionalized Hydroxyl Graphene.

The samples were subject to a UV doses of 9500 MJ/cm2 during seven days (168 hours) using a UV Xenon lamp in the spectral regime around 365 nm and power density 80-120 W/cm. The original and UV-irradiated samples were measured four times, using a SP60 sphere spectophotomer X-rite (D65/10), and averaged to obtain final colorimetric data. The chromatic information for some of the samples is given in the table 4. The data include a black solid surface considered as best practice technology (Δh) (benchmark) for comparison purposes.

TABLE 4

Spectophotometric results (CIE 1976 L*a*b*)

| sample | L* | a* | b* | h* | C* | Δh* |
|---|---|---|---|---|---|---|
| benchmark | 28.53 | −1.04 | −1.24 | −2.44 | 1.62 | 14% |
| benchmark UV | 28.76 | −0.71 | −1.92 | −2.79 | 2.05 | |
| sample 2 | 28.56 | 0.20 | 0.29 | 0.60 | 0.35 | −90% |
| sample 2 after UV | 29.93 | 0.04 | 0.69 | 0.06 | 0.69 | |
| sample 5 | 31.23 | 0.24 | 0.31 | 0.66 | 0.39 | −51% |
| sample 5 after UV | 34.39 | 0.13 | 0.39 | 0.32 | 0.41 | |

Surface degradation is a common problem in polymeric composites when they are exposed to sunlight, altering its mechanical and aesthetical properties. Ultraviolet (UV) radiation is an efficient catalyst of organic polymer decomposition generating mass loses and generating colour modifications such as yellowing or whitening as a function of UV exposure time. Several studies show that the perception of blackness depend basically on the hue (h*), when comparing different black objects. A hue (h*) value of cero is associated with the more blackness object.

With the state of the technique it is expected an increase in the absolute value of h* after UV treatment. Results obtained for the benchmark composite are in line with the assumed behaviour of current materials with an 14% increment in the h* value.

Surprisingly, the samples of the material of this invention show the opposite behaviour, getting closer to cero. Remarkably, sample 2 (with 1% of G-OH) reduces its hue (h*) to almost cero after UV treatment, with a 90% reduction.

Figure 7:
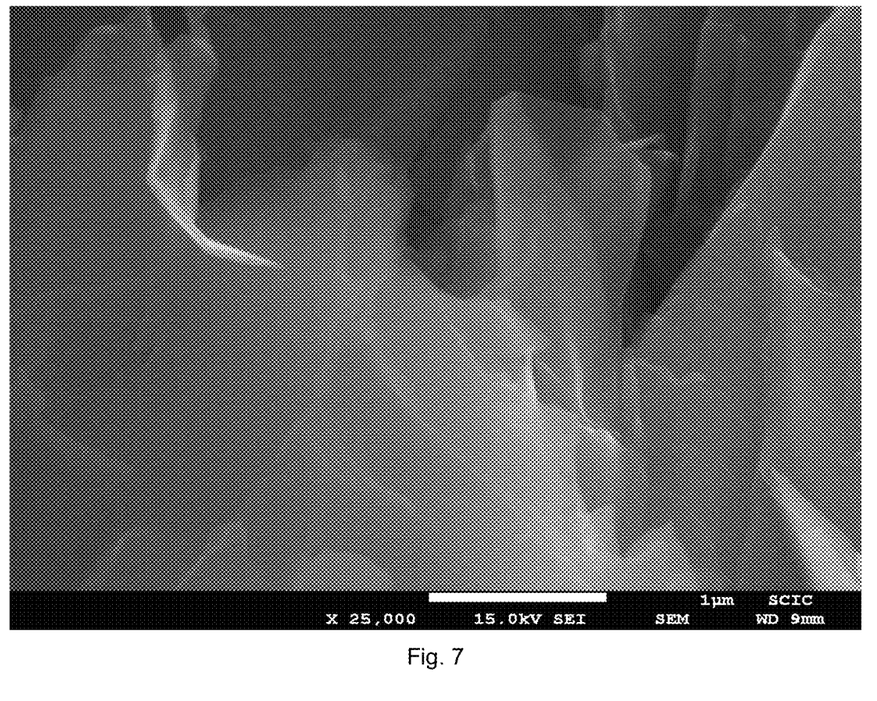
Figure 8:
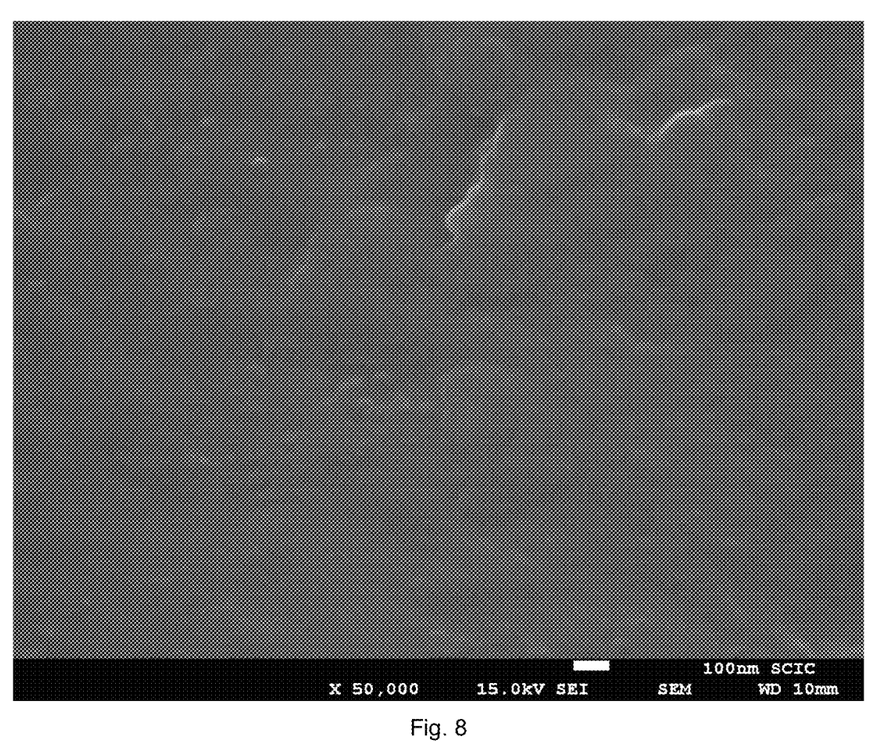
FIG. 8. SEM image showing the functionalized graphene coated with the polymer before UV treatment,
FIG. 9. SEM image showing the functionalized graphene coated with the polymer after UV treatment.
Figure 9:
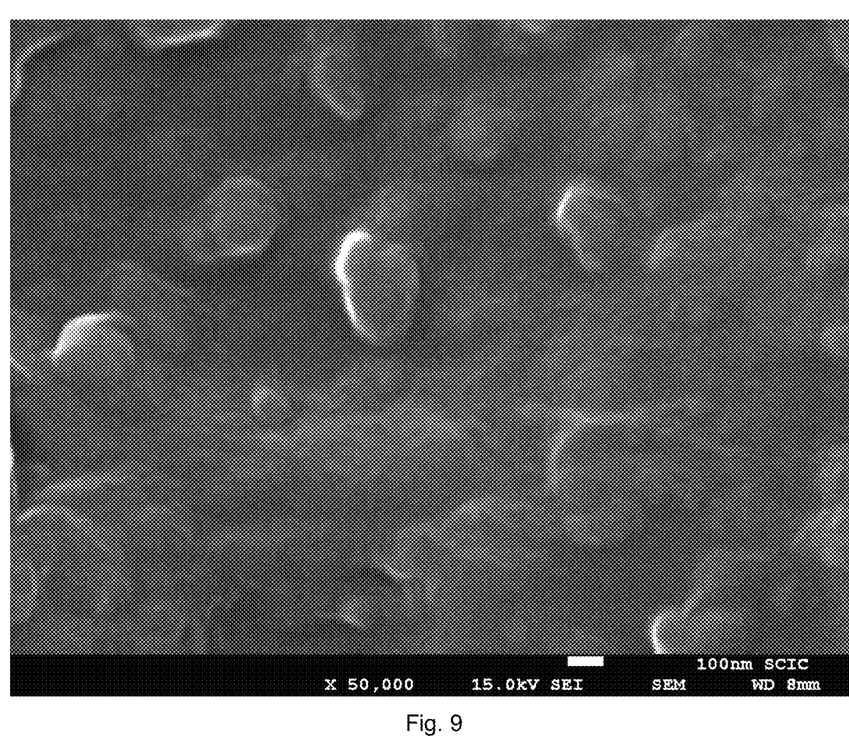

At the contrary of other black composites, which loss blackness with solar radiation exposure, the perceived blackness of the invention increases after UV radiation. This is considered an exceptional and unexpected behaviour. FIG. 7 shows how the UV exposure degrades the polymer emerging the graphene crystals.

Example 7

Tribological Analysis of the Thermosetting Polymer with the Silane-Functionalized Hydroxyl Graphene.

Friction and wear testing were done according to DIN 50324 with a T79 multi-axis tribometer in pin on disc mode at 5N load 20 rpm using samples 20 mm long and 8 mm of diameter with a total distance of 50 m for each sample. The average friction coefficient (μ) decreases as the content of graphene increases (table 5) due to the auto-lubricant propriety of the material.

TABLE 5

Friction coefficient improvement

| sample | μ average (x100) |
|---|---|
| 1 | 68.98 |
| 2 | 67.65 |
| 3 | 61.11 |
| 4 | 54.07 |
| 5 | 43.84 |

TABLE 5-continued

Friction coefficient improvement

| sample | μ average (x100) |
|---|---|
| 6 | 39.97 |
| 7 | 36.59 |
| 8 | 31.23 |

The average mass lose was computed to obtain indicative abrasion resistance data. Table 6 shows the reduction in mass loses in comparison with sample 1 (the resin without graphene). Abrasion data shows a tendency to increase abrasion resistance as the wt % of f-G-OH increases, until the sample 7 (45% wt % of f-G-OH). Sample 8 (50% wt % of f-G-OH) still shows a elevated resistance.

TABLE 6

Average improvement in mass loses

| sample | average |
|---|---|
| 2 | 18% |
| 5 | 66% |
| 6 | 74% |
| 7 | 86% |
| 8 | 79% |

Example 8

When an XPS measured is done to the product obtained in example 1, the spectrum shows only a singlet at 533.4 eV which indicates the exclusive existence form of oxygen-containing groups is hydroxy. This can be read in Sun et al. (2016) [Sun, J. Deng, Y., Li, J., Wang, G., He, P., Tian, S., . . . & Xie, X. (2016), A new graphene derivative: hydroxylated graphene with excellent biocompatibility. *ACS applied materials & interfaces,* 8(16), 10226-10233]. Besides, the exclusive presence of OH functional groups can easily re-confirm obtaining iodine-graphene (G-I) by hydrothermal reaction of G-OH in KI aqueous solution (3.5 mM) under 120° C. for 24 h. The reaction is reversible through halogenating and hydrolysis reaction cycles. It is well known, that the hydroxyl group is easily substituted by I⁻.

The absence of O signal in the XPS spectrum for G-I indicates that all the C—OH groups are replaced by the C-I groups. Moreover, using the habitual techniques EDS and FTIR spectrum is possible to double confirm these results. However due to the experimental error, always present, we assume a small percentage of other than OH groups.

The invention claimed is:

1. A compact compound comprising:
    a) hydroxyl graphene functionalized with silane;
    b) a thermosetting polymer;
   wherein the percentage of hydroxylation in the graphene unfunctionalized is between 90% and 100% by the presence of the singlet at 533.4 eV as measured by XPS; and
      wherein the amount of the thermosetting polymer is between 40% and 99% in weight with respect the compact compound.

2. The compact compound according to claim 1, wherein the hydroxyl graphene is monolayer or multilayer.

3. The compact compound according to claim 1, wherein the thermosetting polymer is selected from bis-phenol-A glycidyl ether, novalic glycidil ethers, aliphatic glycidyl ethers, hydantoin glycidyl ethers, cycloaliphatic epoxides and brominated modifications of thereof, epoxy acrylate resin, orthophtalic polyester resin, isophtalic polyester resin, polyether polyols, and polyalkylene glycols.

4. The compact compound according to claim 1, wherein the silane is 3-methacryl oxypropyl-trimethoxysilane.

5. The compact compound according to claim 1, wherein further comprising a reinforcement material selected from silica, quartz, glass, clay, aluminium, alumina trihydrate, cristobalite, carbon fiber, glass fiber woven sheets and any combination thereof, and wherein the reinforcement material average size is between 1 nm and 5000 μm.

6. The compact compound according to claim 1, wherein further comprising a fire-retardant additive selected from ATH, ammonium polyphosphate, magnesium hydroxide, Magnesium aluminum-layered double hydroxide (LDH), LDH carbonate, d-LDH, aluminium diethyl phosphinat and melamine polyphosphate.

7. The compact compound according to claim 1, further comprising a pigment with an average size of between 1 nm and 5000 μm and selected from:
   metal oxides, wherein the metal is selected from aluminium, iron, copper, titanium, manganese, cobalt, cadmium, zinc and any combination thereof;
   metal salt, wherein the metal is selected from aluminium, iron, copper, titanium, manganese, cobalt, cadmium, zinc and any combination thereof; and
   any combination thereof.

8. A method for obtainment the compact compound according to claim 1 comprising the following steps:
   a) Obtaining the hydroxyl graphene from graphite, wherein the percentage of hydroxylation in the graphene is between 90% and 100% by the presence of the singlet at 533.4 eV as measured by XPS;
   b) Silanization of the hydroxylate graphene obtained in step (a) with sonication and mechanical agitation;
   c) Dispersing the precursor of the thermosetting polymer into the silane-functionalized hydroxylate graphene obtained in step (b) by mechanical agitation and sonication, and polymerizing; and
   d) Curing by thermal treatment of the product obtained in step (c).

9. The method according to claim 8, wherein the obtainment of the hydroxyl graphene of step (a) is performed by following the following steps:
   a1) mixing an amount of between 99 g and 101 g of graphite, and amount of between 8 g and 12 g of 2M NaOH in a volume of between 250 mL and 350mL of $H_2SO_4$ 98%, and adding an amount of between 70 g and 90 g of $KMnO_4$ to the mixture at a temperature of between 1° C. and 10° C. with stirring for a time of between 30 min and 40 min,
   a2) injecting the mixture obtained in step (a1) in a Couette—Taylor flow reactor, and mixing for a time period of between 1 h and 1,2 h at a rotating speed of the inner cylinder between 900-1100 rpm,
   a3) 400-450 ml of purified water and 90-100 ml of peroxide, $H_2O_2$ 30%, is added to the mixture obtained in step (a2), and then stirred for 45-50 min, and precipitating out the non- or under-hydroxilated graphitic particles by further centrifugation at 4000 rpm for 30 min;
   a4) purifying the slurry obtained in the step (a3) for a period time of between 1 h and 3 h by centrifugation at a revolution of between 3700 rpm and 4200 rpm for a time of between and filtering the particles formed after centrifugation by press filter, wherein distilled water is continually fed into the reactor; and
   a5) dispersing in water the remaining solid obtained in step (a4) and filtering in a membrane with a pore of 1 μm or less, and drying the recovered solid after filtration.

10. The method according to claim 8, wherein the obtainment of the hydroxyl graphene functionalized with silane of step (b) is performed by the following steps:
    b1) hydrolysing an organosilane in a water solution
    b2) adding progressively the dry hydroxyl graphene obtained in step (a) into the water solution obtained in step (b1) maintain the magnetic agitation for at least 15 min.,
    b3) sonicating the mixture obtained in the step (b2) for a period of time of between 30 min and 60 min with a frequency of between 20 kHz and 40 kHz; and
    b4) drying the solid obtained in step (b3) at a temperature of between 100° C. and 150° C. for a period of time of between 4 h and 6 h.

11. The method according to claim 8, wherein step (c) is performed by the following steps:
    c1) dispersing the precursor material of the thermosetting polymer for at least 15 min on the hydroxylate graphene functionalized with silane obtained in step (b) under magnetic vibration;
    c2) adding an initiating polymerization agent and a catalytic drier into the mixture obtained in step (c1) stirring for at least 2 min at a temperature of between 30° C. and 50° c; and
    c3) sonicating the mixture obtained in the step (c2) for a period of time of between 30 min and 60 min with a frequency of between 20 kHz and 40 kHz.

12. The method according to any of claim 8, wherein the curing of step (d) is performed at a temperature of between 15° C. and 25° C. for a time period of between 20 h and 28 h.

13. The method according to claim 12, wherein an additional post cured is performed at a temperature of between 55° C. and 75° C. for a time period of between 3 h and 6 h.

14. An overcoat painting comprising the compact compound of claim 1.

* * * * *